Aug. 19, 1958     R. B. MATTHEWS     2,848,167
CONDITION RESPONSIVE CONTROL APPARATUS
Filed March 26, 1953
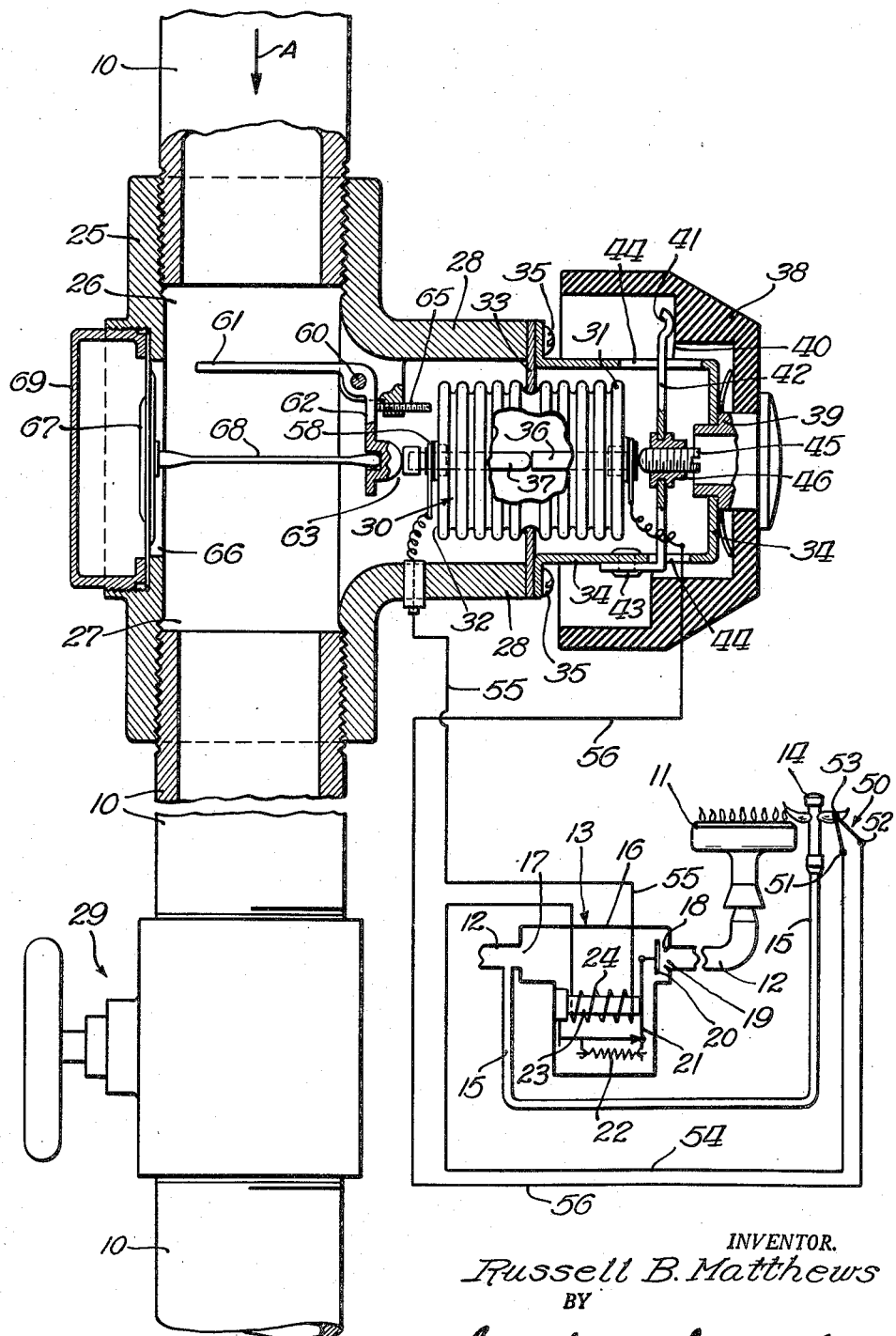
INVENTOR.
*Russell B. Matthews*
BY
*Brown, Jackson, Boettcher & Dienner*
Attys.

United States Patent Office 2,848,167
Patented Aug. 19, 1958

2,848,167

CONDITION RESPONSIVE CONTROL APPARATUS

Russell B. Matthews, Wauwatosa, Wis., assignor to Baso Inc., Milwaukee, Wis., a corporation of Wisconsin Application March 26, 1953, Serial No. 344,731

21 Claims. (Cl. 236—21)

This invention relates, in general, to condition responsive control apparatus, and, although not limited thereto, has particular utility in controlling, for example, the flow of fuel for instantaneous water heaters.

The particular device which will be described hereinafter in connection with the drawing is particularly adapted to control of electromagnetically operated control devices of the type disclosed and claimed in the copending application of Gerald E. Dietz and Adolph J. Hilgert, Serial No. 292,488, filed June 9, 1952, and further has particular utility when employed in an electric circuit and apparatus including such control devices, as is more fully disclosed in the copending application of Adolph J. Hilgert and Russell B. Matthews, Serial No. 289,242, filed May 22, 1952 issued as Patent No. 2,717,123. It is to be understood, however, that the present invention is not limited to this particular device or to the particular use to be described, but may be embodied in other forms and used for other purposes.

One of the main objects of the present invention is to provide a condition responsive control device which is responsive to at least two different conditions such, for example, as changes in temperature and the flow or velocity of a fluid, more particularly the flow or velocity of the water in the hot water outlet of an instantaneous water heater.

Another and more specific object is to provide in a condition responsive control device a hermetically sealed enclosure expansible and contractible in response to changes in a first condition and having a first movable end movable with expansion and contraction of the enclosure, a second movable end at the opposite end of the enclosure movable in response to changes in a second condition, and a pair of cooperating contacts within the enclosure one tending to move with the first movable end in a direction away from its cooperating contact upon expansion of the enclosure and tending to move with the first movable end toward its cooperating contact upon contraction of the enclosure responsive to changes in the first condition; the other cooperating contact being movable with the second movable end in a direction toward and away from its cooperating contact responsive to changes in the second condition.

Another object is to provide a condition responsive control device of the aforementioned character wherein there is an electric circuit in circuit with the contacts and a source of small electric energy, more particularly a thermoelectric generator for energizing said circuit.

Another object is to provide a device wherein there is an electric circuit in circuit with the contacts and under control thereof, a source of small electric energy for the circuit, and an electromagnetically operated fuel shut-off valve connected to and powered by the circuit and controlled by relative movement of said cooperating contacts.

Another object is to provide a device wherein there is a fixed support for the enclosure intermediate the first and second movable ends thereof.

Another object is to provide a device wherein the expansion and contraction of the enclosure and movement of the first movable end thereof is resposive to changes in temperature whereas movement of the second movable end is responsive to flow or velocity of the fluid.

Another object is to provide a device wherein there is a control setting for the temperature responsive enclosure, and pressure compensating means effective to eliminate the effect of pressure variation on the control setting of the temperature responsive enclosure.

Another object is to provide a device in which the same cooperating contacts are under control of at least two different conditions and the volatile fill or other expansible and contractible fluid within the hermetically sealed expansible and contractible enclosure acts not only to produce expansion of the enclosure, but, by disposition of the contacts therein, to keep the contacts clean.

Another object is to provide in one compact control device a fluid flow or velocity actuated contact, plus a temperature responsive device with sealed contacts one of which may constitute the fluid flow or velocity actuated contact which device can be readily inserted, for example, in the hot water outlet of an instantaneous water heater.

Further objects and advantages, and numerous adaptations of the invention will appear from the following detailed description taken in connection with the accompanying drawing wherein the single figure shows one illustrative embodiment of the invention with the condition responsive control device in section and the electric circuit and the electromagnetically operated fuel shut-off valve connected to and powered by such circuit shown more or less diagrammatically.

Referring now to the drawing, in the embodiment of the invention illustrated therein the numeral 10 indicates, for example, the hot water outlet pipe of an instantaneous water heater. The heater is provided with a main burner shown more or less diagrammatically at 11. The burner 11 is supplied with gaseous fuel by a pipe 12 and a main burner fuel control valve 13 is shown as disposed in the pipe 12.

A pilot burner 14 is shown as located in juxtaposition to the main burner 11 to maintain a pilot burner flame for igniting the main burner. The pilot burner 14 is supplied with gaseous fuel through a pipe 15, shown, for example, as connected with the main fuel supply pipe 12 ahead of the control valve 13, although if desired provision may be made for 100% shut-off of the fuel for both the main burner and the pilot burner upon extinguishment of the pilot burner flame.

The main burner fuel control valve 13 is preferably of the type shown and described in the copending application for patent of Gerald E. Dietz and Adolph J. Hilgert, Serial No. 292,488, filed June 9, 1952. This type of valve can be operated as it is in the illustrated embodiment of the present invention on thermoelectric power exclusively, said valve being normally closed, and being movable to open position in response to the flow therethrough of a predetermined thermoelectric current. Thus, the valve 13 can not only provide safety shut-off on failure of the pilot burner flame, but can also operate under the control of the condition responsive control device to be presently described and particularly the thermostat or temperature responsive portion thereof to provide highly sensitive temperature responsive main burner control.

The structure of the valve 13 will not be described in detail herein, reference to the copending application Serial No. 292,488 being had for this purpose. Suffice it to state for the purposes of the present application that the valve 13 has a casing 16 provided with a fluid inlet 17 and a fluid outlet 18, there being an annular valve seat 19 at the outlet 18. A valve member 20 normally sealingly engages the valve seat 19 to prevent the flow of fluid fuel to the burner 11, said valve being movable to a retracted open position. The valve member 20 is carried by a pivotally mounted arm 21 which is urged by a spring 22 in a direction to move the valve member 20 toward the seat 19. The arm 21 and spring 22 form a part of an electromagnetic valve operator which includes an electromagnet 23 having, for example, a pair of coils one of which is shown at 24. The valve operator also includes an armature (not shown) having a resilient connection with the arm 21, said connection providing an energy storing means, the structure and operation of which is more specifically described in the aforementioned copending application Serial No. 292,488.

The condition responsive control device according to the present invention comprises a fitting 25 inserted into the hot water outlet pipe 10 and having a fluid inlet 26 and a fluid outlet 27 connected to contiguous sections of the pipe 10. The direction of flow of hot water through the pipe 10 and fitting 25 is indicated by the arrow A. The fitting 25 is of generally T-shaped form and has a branch or leg 28 opening from the interior of the fitting 25 intermediate the inlet 26 and outlet 27. The hot water outlet pipe 10 is shown as provided with a valve 29 operable (for example, manually) to open and closed positions.

The condition responsive device comprises a hermetically sealed bellows 30 expansible and contractible in response to changes in temperature and having a first movable end 31 movable with expansion and contraction of the enclosure and a second movable end 32 at the opposite end of the bellows movable in response to flow or velocity of water through the outlet 10. The bellows 30 has a flange 33 integral therewith or secured thereto intermediate the first movable end 31 and the second movable end 32. This flange is mounted or fastened to the outer end of the branch or leg 28, for example, with a bracket 34 as by means of screws 35 or other suitable means. The bellows 30 is thus mounted within the branch or leg 28 so that the bellows ends 31 and 32 are free to move independently of each other.

Except for the second movable end 32, the control responsive to movement of this end, the mounting of the bellows so that both ends are free to move independently and the independent action of the ends of the bellows and particularly the temperature responsive portion thereof with the temperature adjusting means therefor is of the type shown and described in the copending application for patent of Adolph J. Hilgert, Serial No. 291,047, filed May 31, 1952, issued as Patent No. 2,724,030. This type of thermostat has extremely high sensitivity and very low differential and it is well adapted for the control of thermoelectric circuits by reason of the low contact resistance.

Suffice it to state, for the purposes of the present application, that the device has a pair of cooperating electrical contacts 36 and 37 which are disposed within the bellows 30. The contact 36 is carried by and movable with the movable end 31 of the bellows and the contact 37 is carried by and movable with the opposite movable end 32 of the bellows. A dial or temperature adjusting knob 38 is mounted for rotation or turning movement in the bracket 34 at 39. As shown more fully in the copending application Serial No. 291,047 issued as Patent No. 2,724,030, the knob 38 has an annular cam surface 40 which is inclined and cooperates at 41 with the free end of a spring lever 42 which extends diametrically across the movable end 31 of the bellows. The opposite end of the spring lever 42 is fixed to the bracket 34, for example, by a rivet 43. The bracket 34 has openings 44 through which the spring lever 42 extends. A factory adjustment screw 45 may be screwed through a sleeve 46 fixed in the spring lever 42 for factory adjustment of the device as more fully disclosed in the aforementioned copending application Serial No. 291,047 issued as Patent No. 2,724,030.

The bellows 30 is filled with a volatile fluid whose vapor pressure increases and decreases with accompanying movement of the movable end 31 of the bellows upon rise and drop in temperature, for example, the temperature of the heated water in the outlet 10 and surrounding the bellows. Reference is directed to the copending application for patent of Adolph J. Hilgert, Serial No. 265,445, filed January 8, 1952, now Patent No. 2,719,201, for suitable fills for filling the bellows 30, but it is to be understood that other fills may be employed.

The electromagnetic operator for the valve 20 may be powered by a single thermocouple 50 or by a thermopile or other similar source of small electric energy. In the illustrated embodiment of the invention, the single thermocouple 50 comprises dissimilar thermocouple elements 51 and 52 joined at 53 to form a "hot" junction which is positioned to be heated by the flame of the pilot burner 14. The thermoelectric circuit is from one thermocouple element 51, for example, through a conductor 54 to one terminal of the coil or coils 24 of the electromagnetic operator, from the other terminal of the coil or coils 24 through a conductor 55 to one contact 37 and from the coperating contact 36 through a conductor 56 to the other thermocouple element 52.

It will be apparent that the electromagnetic operator 23 and the contacts 36 and 37 are connected in series circuit relation with the thermocouple 50. The circuit described is, of course, merely illustrative. Where the bellows 30 is of metallic conducting material, one contact such, for example, as the contact 37 may be insulated at 58 from the movable end of the bellows.

Pivoted at 60 within the fitting 25 is a vane 61 against which the water which flows through the outlet 10 impinges when the valve 29 is actuated to open position. The vane 61 has a bell crank arm 62 which operatively coacts with the contact 37 at 63 and moves it toward or against the contact 36 to an operating position in coacting relation with the latter contact, by counterclockwise movement of the vane 61 about its pivot 60. The movable end 32 of the bellows is biased, for example, by the inherent resiliency of the adjacent end of the bellows so that when the valve 29 is turned off the velocity or flow component of the fluid in the outlet 10 falls to zero and the movable end 32 urges the vane 61 back to its starting position and the contact 37 in a direction away from the contact 36 to a released position out of coacting relation with the latter contact. The fitting 25 may have a stop 65 for coacting with the bell crank arm 62 limiting movement of the contact 37 and the movable end 32 of the bellows 30 to the left as shown in the drawing, while water flows through the fitting 25. That is to say, impingement of water on the vane 61 exerts sufficient force thereon to pivot the crank arm 62 into engagement with the stop screw 65, while at the same time moving the bellows end wall 32 and contact 37 to the right to the operating position shown, against the inherent resiliency of the bellows 30 and the resistance of the bellows fill to compression. The coaction of the stop 65 with the crank arm 62 defines the operating position of the bellows wall 32 and contact 37 and prescribes the limit of the movement of said wall and contact to the left as long as water impinges against the vane 61.

The fitting 25 has an opening 66 in alignment with the branch 28 which opening is covered by a pressure compensating flexible metal diaphragm 67 the purpose of which is to eliminate the effect of pressure variation on the control setting of the temperature responsive end 31 of the bellows 30. The diaphragm 67 is connected to the end 32 of the bellows 30 by a stem 68 attached at one end to the diaphragm 67 and at its opposite end to the bell crank arm 62 as shown. A removable cap 69 attached to the fitting 25 covers the diaphragm 67.

The compensating connection is such that any effect of pressure variation on the control setting of the temperature sensitive bellows will be compensated for by the effect of such pressure variation on the diaphragm 67 and the action of this diaphragm under such pressure variation.

More specifically, a fluid pressure increase tends to compress the bellows 30 and move the end wall 32 toward the right. Said pressure increase, however, also tends to move the diaphragm 67 toward the left with substantially equal force. Since the stem 68 is attached to both the diaphragm 67 and the bell crank arm 62, the total force exerted on the bellows wall 32 and tending to move the latter to the right is reduced by the amount of the force exerted on the diaphragm in the opposite direction by said pressure increase. The net effect of the pressure increase on the bellows 30, therefore, is zero. Similarly, a pressure drop in the fitting 25 tends to allow the bellows 30 to expand and move the wall 32 thereof to the left. This pressure drop, however, also tends to move the diaphragm 67 to the right with substantially equal force. Since the stem 68 and lever 62 are connected between the diaphragm 67 and the bellows wall 32, the force tending to move the bellows wall 32 to the left in response to a pressure drop is compensated for, or cancelled out, by an equal force tending to move the diaphragm 67 toward the right, and the net effect of said pressure drop on the bellows 30 is also zero.

The operation of the illustrated embodiment of the invention is as follows:

When the valve 29 is actuated to open position, water impinges on the vane 61 which pivots counterclockwise about the pivot 60 and moves the contact 37 against the contact 36 until the circuit for the electromagnetic operator 23 is completed or enabled which causes the electromagnetic operator to be energized and actuate the valve 20 to open position thereby turning on or establishing a flow of fuel to the main burner 11 which is ignited by the pilot burner 14.

After the main burner 11 has been turned on, the heated water surrounding the bellows 30 causes the temperature responsive fill to expand which moves the contact 36 in a direction away from the contact 37 which disables the circuit for the electromagnetic operator 23 with accompanying deenergization of the electromagnetic operator and movement of the valve 20 to closed position shutting off the main burner.

As previously described the effect of pressure variation on the control setting of the temperature sensitive bellows is compensated for by the pressure compensating metal diaphragm 67.

If in the embodiment of the invention selected for illustration at any time the flame of the pilot burner 14 becomes extinguished, thereby creating an unsafe condition, the thermocouple 50 will be deenergized and the flow of energizing thermoelectric current in the coil or coils of the electromagnetic operator 23 will be discontinued. When this occurs the valve 20 moves to closed position thereby providing safety shut-off for the fuel for the main burner.

The embodiment of the invention shown in the drawing is for illustrative purposes only and it is to be expressly understood that said drawing and the accompanying specification are not to be construed as a definition of the limits or scope of the invention, reference being had to the appended claims for that purpose.

I claim:

1. A condition responsive control device comprising a hermetrically sealed enclosure expansible and contractible in response to changes in a first condition and having a first movable end movable with expansion and contraction of said enclosure, a second movable end at the opposite end of said enclosure movable in response to changes in a second condition, and a pair of cooperating contacts within said enclosure one tending to move with said first movable end in a direction away from its cooperating contact upon expansion of said enclosure and tending to move with said first movable end toward its cooperating contact upon contraction of said enclosure responsive to changes in said first condition, the other cooperating contact being movable with said second movable end in a direction toward and away from its cooperating contact responsive to changes in said second condition.

2. A condition responsive control device according to claim 1 wherein there is an electric circuit in circuit with said contacts and under control thereof, and a source of small electric energy for said circuit.

3. A condition responsive control device according to claim 1 wherein there is an electric circuit in circuit with said contacts and under control thereof, and a thermoelectric generator for thermoelectrically energizing said circuit.

4. A condition responsive control device according to claim 1 wherein there is an electric circuit in circuit with said contacts and under control thereof, a source of small electric energy for said circuit, and an electromagnetically operated fuel shut-off valve connected to and powered by said circuit and controlled by relative movement of said cooperating contacts.

5. A condition responsive control device according to claim 1 wherein there is a fixed support for said enclosure intermediate said first and second movable ends thereof.

6. A condition responsive control device according to claim 1 wherein the expansion and contraction of said enclosure and movement of said first movable end thereof is responsive to changes in temperature and movement of said second movable end is responsive to fluid flow.

7. A condition responsive control device according to claim 1 wherein the expansion and contraction of said enclosure and movement of said first movable end thereof is responsive to changes in temperature and movement of said second movable end is responsive to fluid flow, control setting means for said temperature responsive enclosure, and pressure compensating means effective to eliminate the effect of pressure variation on the control setting of said temperature responsive enclosure.

8. A condition responsive control device comprising a condition responsive enclosure having opposite ends movable independently of each other, means for supporting said enclosure between said independently movable ends, a pair of contacts one operatively related for actuation by one movable end of said enclosure and the other operatively related for actuation by the other movable end of said enclosure, and a vane actuated by fluid flow and operatively coacting with one movable wall of said enclosure for actuating the same in response to fluid flow, the other movable wall being movable in response to changes in the condition.

9. A condition responsive control device comprising, a condition responsive expansible and contractible enclosure having opposite ends movable independently of each other, one of said enclosure ends being exposed to fluid pressure, a pair of contacts one operatively related for actuation by one movable end of said enclosure and the other operatively related for actuation by the other movable end of said enclosure, fluid flow actuated means operatively coacting with the end of said enclosure exposed to said fluid pressure for actuating said enclosure end in response to fluid flow, and pressure compensating means operatively coacting with said last-mentioned enclosure end to prevent said end from being effected by variations in the fluid pressure to which said enclosure end is exposed.

10. A control device comprising cooperating relatively movable contacts sealed within a temperature responsive expansible and contractible enclosure, and fluid flow actuated means operatively coacting with one of said contacts to actuate the same responsive to fluid flow.

11. A control device comprising cooperating relatively movable contacts sealed within a temperature responsive expansible and contractible enclosure having a movable wall exposed to fluid pressure, fluid flow actuated means operatively coacting with one of said contacts to actuate the same responsive to fluid flow, and pressure compensating means operatively coacting with the end of said enclosure exposed to said fluid pressure to prevent said end, and hence the temperature response of said enclosure from being effected by variations in the fluid pressure to which said enclosure end is exposed.

12. A condition responsive control device comprising a condition responsive hermetically sealed expansible and contractible enclosure having a movable wall, first and second low resistance relatively movable contacts within said enclosure, said first contact having a first position and being movable to an operating position, and means for automatically actuating said first contact to said operating position in response to one condition, said second contact cooperating with said first contact when the latter is in said operating position and being connected to said movable enclosure wall for movement therewith toward and away from said first contact in response to changes in a second condition.

13. A condition responsive control device comprising a condition responsive hermetically sealed expansible and contractible enclosure having a movable wall movable in response to changes in a first physical condition of a given fluid, first and second relatively movable contacts within said enclosure, said first contact having a first position and being movable to an operating position, and condition responsive means for actuating said first contact to said operating position in response to a predetermined second physical condition of said fluid, said second contact cooperating with said first contact when the latter is in said operating position and being connected to said movable enclosure wall for movement therewith toward and away from said first contact in response to changes in said first physical condition.

14. A condition responsive control device comprising a condition responsive hermetically sealed expansible and contractible enclosure having first and second movable walls, first and second relatively movable contacts within said enclosure connected respectively to said movable walls for movement therewith, said first contact having a retracted position and being movable with said first enclosure wall to an operating position, and means for actuating said first wall and first contact to said operating position, said second contact cooperating with said first contact when the latter is in said operating position and being movable with said second enclosure wall toward and away from said first contact in response to changes in the condition.

15. A condition responsive control device comprising an hermetically sealed enclosure expansible and contractible in response to changes in a first condition and having first and second movable walls, first and second relatively movable contacts within said enclosure connected respectively to said movable walls for movement therewith, said first contact being biased to a retracted position and being movable with said first enclosure wall to an operating position, and actuating means responsive to a predetermined second condition for actuating said first contact to said operating position, said second contact cooperating with said first contact when the latter is in said operating position and being movable with said second enclosure wall toward and away from said first contact in response to changes in said first condition.

16. A condition responsive control device comprising a condition responsive hermetically sealed expansible and contractible enclosure having a first movable wall movable in response to changes in a first condition, a second movable wall for said enclosure movable in response to changes in a second condition, and a pair of cooperating contacts connected to said movable walls for movement therewith, one of said contacts tending to move with said first movable wall toward and away from its cooperating contact responsive to changes in said first condition, the other cooperating contact tending to move with said second movable wall toward and away from its cooperating contact responsive to changes in said second condition.

17. In combination, a fitting adapted for insertion in the hot water outlet of an instantaneous water heater, said fitting having a water inlet and a water outlet and a branch opening laterally from said fitting between said inlet and said outlet, a bellows-like enclosure having opposite independently movable ends and supported between said ends on said branch of said fitting, a pair of cooperating contacts within said bellows one movable with one movable end of said bellows and the other movable with the other movable end of said bellows, and a vane pivoted in said fitting for actuation by fluid flow through said fitting and operatively coacting with one of said contacts to actuate the same by the pivotal movement of said vane.

18. In combination, a fitting adapted for insertion in the hot water outlet of an instantaneous water heater, said fitting having a water inlet and a water outlet and a branch opening laterally from said fitting between said inlet and said outlet, a bellows-like enclosure having opposite independently movable ends and supported between said ends on said branch of said fitting, a pair of cooperating contacts within said bellows one movable with one movable end of said bellows and the other movable with the other movable end of said bellows, and a vane pivoted in said fitting for actuation by fluid flow through said fitting and operatively coacting with one of said contacts to actuate the same by the pivotal movement of said vane, said fitting having an opening covered by a flexible diaphragm and a stem connecting said diaphragm to a movable end of said bellows and operative to eliminate the effect of pressure variation on said bellows.

19. A control device comprising condition responsive contact means including a movable wall portion exposed to fluid pressure and connected for actuation of a first contact, and pressure compensating means operatively coacting with said movable wall portion to prevent said wall portion from being effected by variation in the fluid presure to which said portion is exposed, said contact means including means forming with said movable wall portion condition responsive actuating means operatively associated with a second contact and affording the latter controlling movement.

20. A condition responsive device comprising contact means, condition responsive contact actuating means exposed to fluid pressure, pressure compensating means operatively coacting with said contact actuating means to prevent said contact means from being effected by variations in said fluid pressure, and fluid flow actuated means operatively coacting with said contact means and responsive to a first magnitude of fluid flow to render said contact actuating means operative to afford said contact means circuit-controlling movement, said fluid flow actuated means also being responsive to a second magnitude of fluid flow to render said contact actuating means inoperative to afford said contact means said circuit-controlling movement.

21. A control device comprising a first contact having a first position and movable to an operating position, a second contact cooperable with said first contact when the latter is in operating position, temperature responsive actuating and contact enclosing means responsive to the temperature of a given fluid and affording said second contact controlling movement with respect to said first contact when the latter is in said operating position, said means including a hermetically sealed enclosure for said contacts, and fluid flow responsive means for actuating said first contact to operating position in response to a predetermined rate of flow of the same given fluid and independent of the temperature thereof.

References Cited in the file of this patent

UNITED STATES PATENTS

| | | |
|---|---|---|
| 243,345 | Lungen | June 21, 1881 |
| 360,823 | Singer | Apr. 5, 1887 |
| 1,265,765 | Ferris | May 14, 1918 |
| 1,505,370 | Buch et al. | Aug. 19, 1924 |
| 1,952,571 | Smith | Mar. 27, 1934 |
| 1,972,990 | Hardgrove | Sept. 11, 1934 |
| 1,976,730 | Irwin | Oct. 16, 1934 |
| 2,016,317 | Dahl | Oct. 8, 1935 |
| 2,119,783 | Harrington | June 7, 1938 |
| 2,164,821 | Katcher | July 4, 1939 |
| 2,185,490 | Wittmann | Jan. 2, 1940 |
| 2,421,768 | Voliazzo et al. | June 10, 1947 |
| 2,431,801 | Gibson | Dec. 2, 1947 |
| 2,454,288 | Michaelson | Nov. 23, 1948 |
| 2,502,556 | Cobb | Apr. 4, 1950 |
| 2,511,094 | Barkas | June 13, 1950 |
| 2,648,741 | Starbird | Aug. 11, 1953 |
| 2,687,457 | Smith | Aug. 24, 1954 |
| 2,756,594 | Hall | July 31, 1956 |